June 18, 1963    M. KAPILOW    3,094,037

VIEWER ATTACHMENT FOR MOTION PICTURE PROJECTORS

Filed Dec. 9, 1960    3 Sheets-Sheet 1

INVENTOR.
MARVIN KAPILOW
BY Kane Dalsimer and Kane
ATTORNEYS

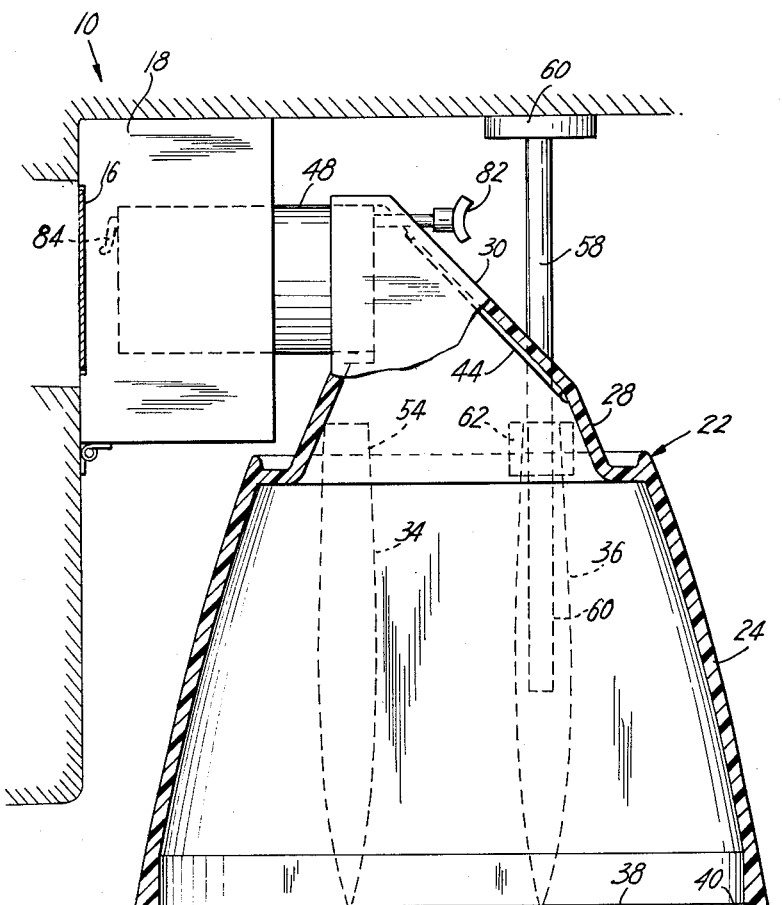
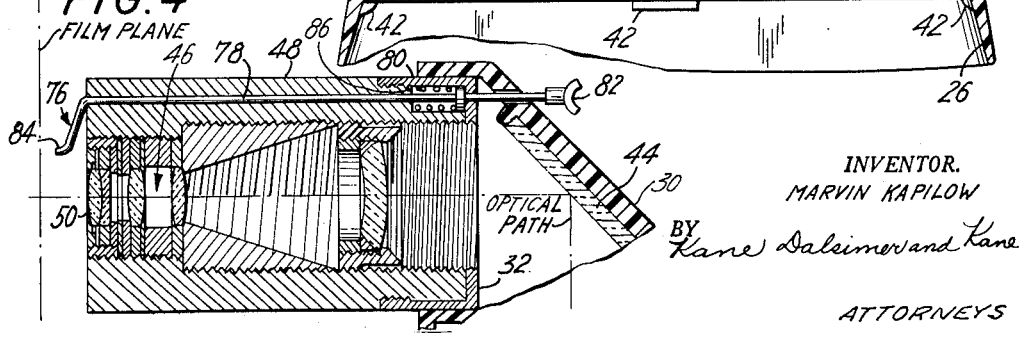

June 18, 1963 M. KAPILOW 3,094,037
VIEWER ATTACHMENT FOR MOTION PICTURE PROJECTORS
Filed Dec. 9, 1960 3 Sheets-Sheet 3
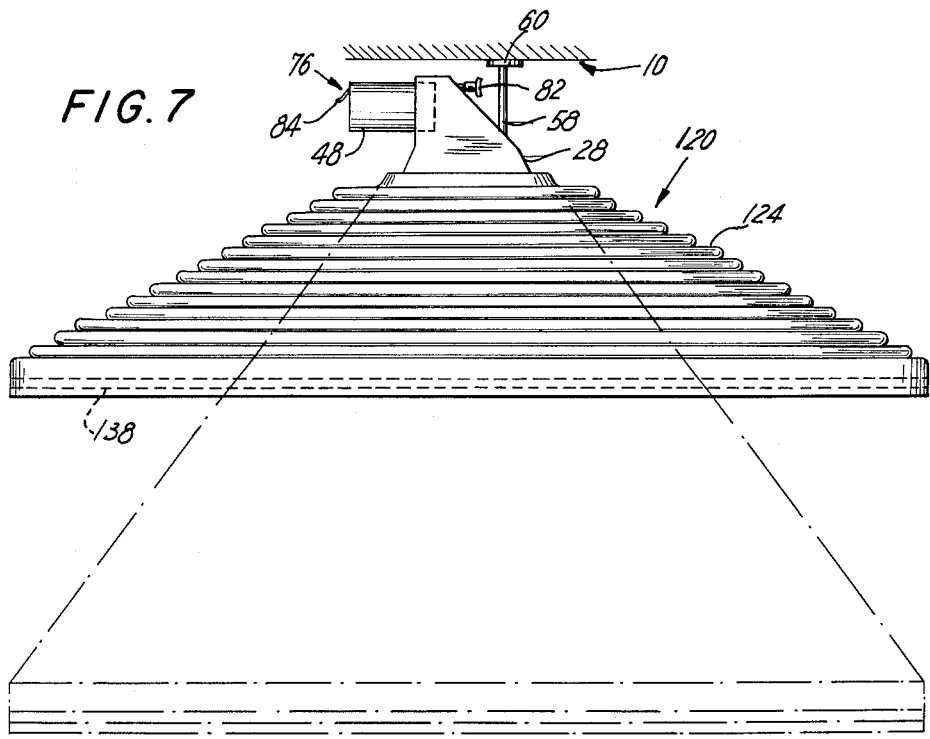
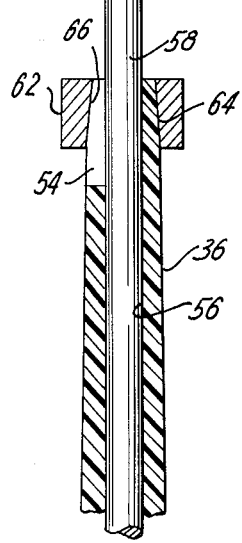
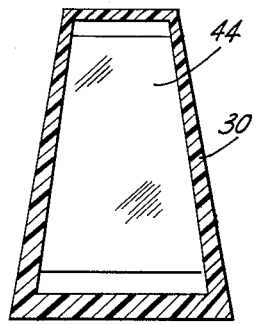
INVENTOR.
MARVIN KAPILOW
BY Kane, Dalsimer and Kane
ATTORNEYS

United States Patent Office 3,094,037
Patented June 18, 1963

3,094,037
VIEWER ATTACHMENT FOR MOTION PICTURE PROJECTORS
Marvin Kapilow, Croton-on-Hudson, N.Y., assignor, by direct and mesne assignments, to Kamar Products, Inc., Irvington on Hudson, N.Y., a corporation of New York
Filed Dec. 9, 1960, Ser. No. 81,662
5 Claims. (Cl. 88—24)

This invention relates to a viewer for motion picture film and, more particularly, to a viewer attachment to be mounted on a motion picture film projector so that film can be viewed directly on the projector.

The motion picture film and projection art is familiar with a number of viewers and editors for motion picture film, which is to be ultimately projected by conventional means. The film, in most instances, was placed on reels which, in turn, were mounted on suitable spindles projecting from the editor. This editor was quite independent of any projector, and the functioning of either did not depend on the other. The film, thus placed on the editor, was edited as desired and then removed for association with a projector for viewing purposes. In this connection, the film was viewed either on the conventional screen or, on the other hand, a viewing means forming either a separate or an integral part of the editor.

However, heretofore, it has never been suggested in the art to provide means for viewing motion picture film directly on the projector so that it may be effectively viewed during the expected projection while, at the same time, edited without necessitating the removal of the film from the projector.

It is, therefore, an object of this invention to provide a viewer attachment for motion picture film projectors such that the film can be viewed directly on the projector without resort to conventional screens for such purposes, thereby rendering possible to utilize the light brightness of the projector and adopt it to obtain a bright picture on a built-in screen, even in ordinary room light.

It is another object to provide a viewer attachment that is capable of being mounted on substantially any make and model of projector by simply removing the projector lens and inserting a similarly shaped tubular lens system forming an integral part of the viewer attachment into the lens mounting of the projector.

It is a further object to incorporate an editing means into a viewer attachment which is adapted to be coupled directly to a projector in accordance with the foregoing construction for purposes of facilitating marking while viewing the film at the desired frame or film sections.

Still another object is to provide a viewer attachment for projectors capable of assuming a collapsed condition thereby establishing minimum space requirements, and, in addition it is capable of being distended longitudinally to permit an enlarged viewing surface to be utilized to advantage and an image or scene of optimum size to be viewed.

Briefly stated, the attachment, in accordance with the present invention, is essentially a viewer consisting of a wide angle, short focal length lens system, a mirror disposed in the optical path of the lens system, and a screen for receiving the projected image from the mirror. The entire assembly is mounted in a housing with the lens system being encased in a tube which is inserted into the lens mounting for a projector after the projector lens has been removed. Thus, the lens tube serves to attach the device to the projector and, at the same time, cooperates in supporting it in a proper viewable position on the projector.

In this connection, support means are additionally provided on the viewer housing for engaging surfaces of the projector so that gravitational forces acting upon the viewer will not rotate it about the longitudinal axis of the lens system. This support means is advantageously adjustable so that the viewer can be coupled with substantially all known types, makes and models of projectors.

A film marker is conveniently incorporated into the viewer structure so that the film being viewed can be edited as desired. In the disclosed embodiment herein, this marker assumes a form of a pin or rod that is adapted to be projected out through an opening in the lens tube to thereby notch the film. In accordance with modern film splicing techniques, it is thereby possible to accomplish substantially all of the editing necessary with appreciable sophistication.

It is also contemplated that by way of a further embodiment, an expansible optical path, created by a bellow-type of chamber, permits enlarged viewing screens to be incorporated into the above structure.

Numerous other objects and advantages will become apparent from the following detailed description, of several preferred embodiments, which is to be taken in conjunction with the accompanying drawings in which:

FIG. 3 is an enlarged plan view of the attachment and associated structure of a supporting projector viewed along the lines 3—3 of FIG. 2, with certain parts of the viewer broken away and removed while others are shown in section;

FIG. 4 is a fragmentary sectional view still further enlarged of the lens system and accompanying viewer structure, as well as a diagrammatic representation of the film plane and optical path;

FIG. 5 is an enlarged fragmentary sectional view of the adjustable peg and boss assembly for creating a resisting movement in counteracting the turning movement about the lens axis due to gravity acting on the view when mounted on a projector;

FIG. 6 is an enlarged fragmentary view of the reflecting mirror and its mounting surfaces;

FIG. 7 is a top plan view of a further embodiment of a viewer which is capable of presenting an enlarged viewing screen together with minimum space requirements when not in use.

Figure 1:
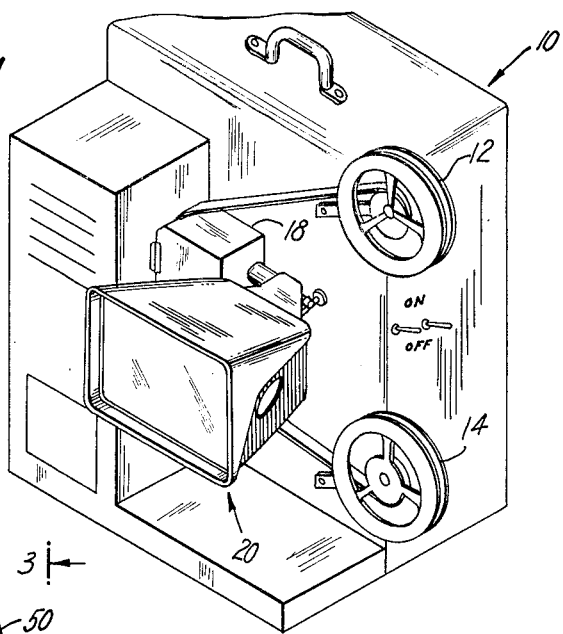
FIG. 1 is a perspective view of a viewer attachment incorporating the teachings of the present invention associated with a projector, with the motion picture film to be viewed properly loaded and guided on the projector.
Figure 2:
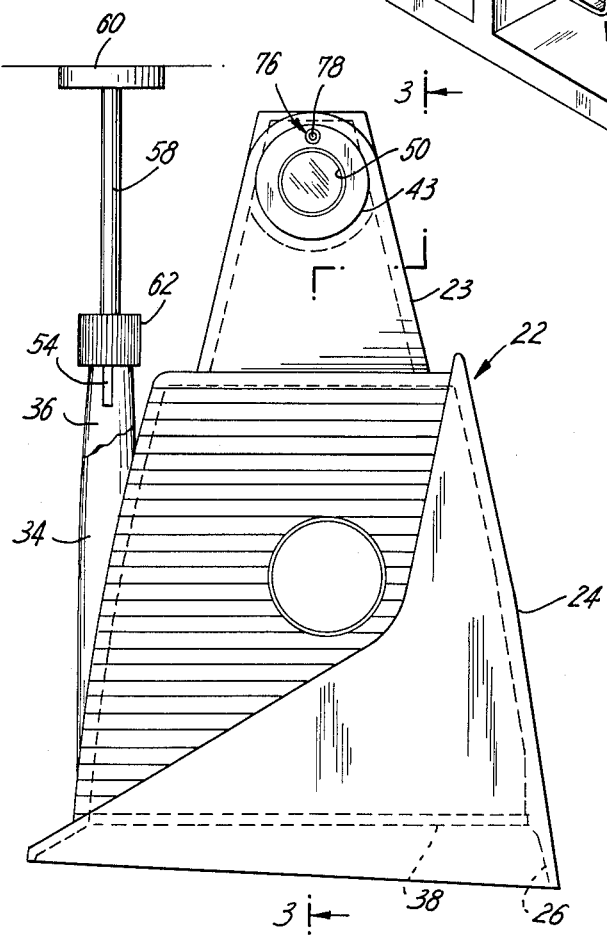
FIG. 2 is a side elevational view on an enlarged scale of the viewer attachment.

Referring now to FIG. 1, it will be observed that a projector 10 of any known or commercially available make or model, mounts, in the usual manner, a film supply reel 12 and take-up reel 14. A length of motion picture film 16 to be viewed is associated with these reels and is threaded, as well as guided in the projector through the lens mount 18, in the usual manner. This invention contemplates the removal of the lens ordinarily present in such mount 18 in favor of the lens system of the viewer attachment disclosed herein for reasons that will become apparent shortly. Thus, as illustrated, a viewer attachment 20 is advantageously coupled with the projector 10 so that the film 16 can be conveniently viewed for editing purposes, for example.

In accordance with the disclosed embodiment under consideration, a casing or housing 22 includes a somewhat conically shaped body 24 providing an opening 26 at one end, while the other end extends into a reduced section 28. This reduced section 28 is formed with a substantially planar mirror mount 30 disposed oblique with respect to the open end 26 of the conical body 24, as well as the opening 32 formed in the reduced section 28. In addition, the housing 22 includes a pair of projecting bosses 34 and 36 which form part of an adjusting means to be described shortly for cooperating in effectively supporting the viewer attachment 20 on the projector 10. For most applications, the housing 20 can be fabricated from any suitable material, such as a commercially available synthetic resin. In this connection, medium impact styrene has been found to perform satisfactorily.

A viewing screen 38 is advantageously mounted interiorly of the housing 22 at the enlarged open end 26 of the substantially conical body 24. Accordingly, the screen 38 may rest against shoulder 40 initially formed in the inner walls of the body 24 and be secured relative thereto by a number of properly positioned tongues 42 substantially as shown. Screen 38 may be substantially translucent and of the type that transmits a directed image impinged upon its rear face. Under such circumstances, the screen 38 is preferably free from surface defects. Also, it should be substantially flat within reasonable limits; and, naturally, as the size of the screen increases, an arcuate configuration approaching that of modern television tubes and screens should be seriously considered. For purposes of the embodiment disclosed, the screen 38 may be formed from plastic, ground glass or any rear projection screen or be a "Fresnel" lens.

In the disclosed embodiment, the screen 38 receives an image that is reflected thereon by means of mirror 44. This mirror 44 is suitably positioned on the planar mirror mount 30 within the section 28 and possesses a reflective surface that is substantially trapezoidal in configuration. The mirror 44, in addition, is of the front surface variety; and, in certain instances, an optically flat mirror to approximately three wave lengths has been found to function satisfactorily. It should be understood that the present invention contemplates the use of a suitable prism for purposes of directing an image onto the screen 38, if conditions would necessitate its use rather than a flat mirror 44. As will be appreciated, mirror 44 is disposed at approximately a 45° angle with respect to the plane defined by the screen 38.

It should be understood, that the usual lens of projectors possess focal lengths that, out of necessity, would result in a rather significantly miniaturized image when projected on a screen of the compact viewer attachment 20 of the contemplated dimensioned proportions. Accordingly, for purposes of the instant invention, the lens projector 10 is removed initially from the lens mount 18 and replaced by the lens system 46. In this connection lens system 46 projects outwardly from the opening 32 of the reduced section 28 of the housing 22, and is suitably affixed therein. The lens system 46 of the viewer attachment 20 is preferably a wide angle, short focal length lens assembly.

Obviously, the parameters and characteristics of the lens system 46, as well as that of its individual components, will vary depending upon the conditions and requirements. For this reason, the lens system 46 illustrated in FIG. 4 will not be described in detail, other than to say, that it represents a system that has been found to work satisfactorily; and it constituted a five element lens system which was rated as a f2.5, 7 mm. projection lens. In this system, the mounting tube 48 was formed from anodized aluminum; and, the resolution of the lens system 46 was 80 lines per millimeter at the center, while, on the other hand, 50 lines per millimeter at the respective corners. The aperture 50 of the lens system 46 will under ordinary circumstances of use be disposed adjacent the film plane, as shown, such that the optical path will project the image onto the screen 38 following impingement upon mirror 44.

As mentioned in the foregoing, the housing 22 includes a pair of projecting bosses 34 and 36 forming part of a supporting or standard means which serves to maintain the screen 38 properly oriented with respect to the projector 10. For most practical purposes, the screen 38 is preferably maintained in a substantially vertical position for viewing. Accordingly, both bosses 34 and 36 will include at their free ends longitudinally extending slots 54 spaced symmetrically about the boss axis, as for example, at 120° intervals. Each of the bosses 34 and 36 also include a longitudinally extending bore 56. Thus, at the free ends of the individual bosses 34 and 36, the formed longitudinal slots 54 and associated bore 56 cooperate to provide a certain degree of resiliency and radial flexibility.

Under the circumstances, the bores 56 are adapted to conveniently receive a stud or peg 58 which may be formed with an enlarged head 60. In this connection, the peg 58 is adapted to be inserted into the selected boss 34 or 36, and ultimately be secured therein against any longitudinal displacement.

Although two pegs 58 can thus be advantageously employed, it has been found that one is usually sufficient for all intents and purposes. Since, the viewer attachment 20 has been designed for application to substantially all known as well as commercial projectors 10, it may be found that because the particular structure of projector 10 encountered the location of peg 58 it may be restricted to either boss 34 or 36, as the case may be.

In securing the peg 58 in the selected boss, a collet 62 is telescoped over the slotted end of the mounting boss such that the surfaces of its internal bore will force the flexible slotted end of the boss radially inwardly against the outer surfaces of the peg 58. Both the free end 64 of the boss 34 or 36 and inner bore 66 of collet 62 tapers as shown to facilitate this union. Obviously, the exposed length of the peg 58 can be adjusted for purposes of assuring that the plane of the screen 38 is substantially vertical or oriented in any other preferred disposition.

Summarizing the operation of the viewer attachment 20, it should be evident that following the threading of the film 16 from the supply reel 12 to the take-up reel 14 and properly guiding it through the gate mechanism normally associated with the lens mount 18, the viewer attachment 20 is then properly coupled with the projector 10. The lens of the projector 10 can be removed at any time relative to the threading of the film 16 and the lens system 46 substituted such that its aperture 50 will ultimately be adjacent the film 16. Thus, when the projector 10 is in an "on" position, with its lamp burning and the drive actuating the film 16, the images appearing on the film 16 will be transmitted through the elements of the lens system 46 to eventually impinge upon the mirror 44. The optical path will be such that the image will be reflected from the mirror 44 and eventually be directed upon the screen 38. The visible image will consequently be substantially enlarged and readily discernible. Under such circumstances, the operation of the viewer attachment 20 and the ability to view the film 16 in any desired sequence or manner whatsoever will depend upon the operation of the projector 10 and by the same token controlled thereby.

The present invention considers the association of an editing means 76 with the viewer attachment 20. In essence a rod 78 possessing a shape and configuration substantially similar to that shown is biased outwardly or away from the expected location of the loaded film to be viewed. This biasing means may be in the form of a spring 80 which is adapted to be compressed by actuating the handle 82 in an inward direction. The other end 84 of the rod 78 will thus be in a position to puncture the film 16 at the desired frame or location. As will be observed, the rod 78 with its associated spring 80 is conveniently housed in a suitably formed passage 86 in the lens tube 48.

When the desired location of the film 16 is reached, its movement in the projector 10 is interrupted while the projector lamp still glows; and the editing means 76 is then actuated for purposes of perforating the film 16 at this location. In this connection, the rod 78 is projected forwardly so that the end 84 punctures the film 16 against the bias of the spring 80 by suitably applied finger pressure of the enlarged handle 82. Upon release of the finger pressure, the spring 80 will return the rod 78 to its original position assuring the inability of the puncturing end 84 interfering with the movement of the film 16 when the projector drive mechanism is restarted. This procedure may be repeated as many times as necessary to accomplish the desired degree and extent of editing.

Although a procedure has been disclosed for perforating the film 16 for editing purposes, it should be understood that the present invention contemplates, associating with the viewer attachment 20, an editing means that either notches, perforates, scrapes, marks or scores, etc., the film to be viewed and edited.

When normal projection onto a distant screen is desired, the viewer attachment 20 is removed from the projector 10 by merely disassociating the lens system 46 from the projector lens mount 18. The projector lens is then reinserted into the aperture of lens mount 18.

There will be a number of applications of the present invention demanding a viewer attachment 120 employing a substantially larger viewing screen 138. In this regard, a bellows 124 is advantageously utilized as the main body portion for the viewer housing. Thus, by simply collapsing and distending the body portion 124, the enlarged screen 138 can be shifted outwardly to its viewing position or inwardly to an inoperative position. In all other respects, the viewer attachment 120 is substantially the same as previously described viewer 20. For this reason, like numerals will be applied for purposes of designating like parts. It should be realized that the size of screen 138 can now approach that of commercially available television screens, or even screens of larger dimensions and proportions.

Thus, the several aforenoted objects and advantages are most effectively attained. Although several preferred embodiments have been disclosed herein, it should be understood that the present invention is in no sense limited thereby, and its scope is to be determined by that of the appended claims.

I claim:
1. A viewer attachment for motion picture film projectors comprising a viewer housing, a relatively wide screen on which film images are to be viewed supported by said housing, a lens system on said housing for transmitting an image from the motion picture film to be viewed, said lens system being adapted to be inserted into the lens mounting of a motion picture projector after the projector lens has been removed and, thusly, be positioned adjacent the film plane of the motion picture film to be viewed, said lens system being a wide angle, short focal lens system, a mirror in said housing for reflecting the image transmitted by the lens system and projecting it on said screen, the optical path of said lens system being substantially parallel to the plane of said screen, said mirror being disposed at approximately 45° to the optical path of the lens system to thereby reflect the transmitted image from the lens system on to said screen, and said housing including an adjustable laterally extending standard means for engaging surfaces of the projector on which said attachment is to be placed for disposing and maintaining said screen in a substantially vertical position.

2. The invention in accordance with claim 1, wherein said standard means includes an adjustable stud and a pair of bored bosses for receiving said stud, said stud being selectively inserted in one of said bosses being adapted to be displaced for purposes of engaging surfaces of the projector on which said attachment is placed so that when said lens system is inserted into the lens mounting for a projector after the projector lens has been removed, the attachment will not rotate about the axis of said lens system due to forces of gravity.

3. The invention in accordance with claim 1, wherein said housing comprises expandable sectors such that the length of optical path from said mirror to said screen is adapted to be increased to thereby permit the use of an enlarged screen while, at the same time, enabling said housing to be collapsed to occupy a relatively reduced space when said attachment is not in use.

4. The invention in accordance with claim 1, wherein said viewer attachment further includes editing means for marking said motion picture film to be viewed at selected locations while it is being viewed on said screen.

5. The invention in accordance with claim 4, wherein said editing means includes a rod mounted on said viewer attachment, and spring means biasing said rod such that it may be projected against the bias of said spring and projected outwardly from said lens system in proximity to the film to be viewed.

References Cited in the file of this patent

UNITED STATES PATENTS

| 578,511 | Hart | Mar. 9, 1897 |
|---|---|---|
| 2,168,761 | Caldwell | Aug. 8, 1939 |
| 2,906,167 | Castedello et al. | Sept. 20, 1959 |

FOREIGN PATENTS

| 527,090 | Great Britain | Oct. 2, 1940 |
|---|---|---|
| 1,129,479 | France | Sept. 10, 1956 |